INVENTOR.
Robert W. Bodley

United States Patent Office 3,095,113
Patented June 25, 1963

3,095,113
VALVE STRUCTURE FOR STORAGE TANK SYSTEM
Robert W. Bodley, Highland, Ind., assignor to Union Tank Car Company, Chicago, Ill., a corporation of New Jersey
Filed Aug. 1, 1960, Ser. No. 47,575
8 Claims. (Cl. 220—85)

The invention relates in general to field storage tank systems and, in particular, to a novel valve structure therefor.

This application is a continuation-in-part application of the co-pending application entitled Storage Tank System, filed June 28, 1957, bearing Serial No. 668,802, now abandoned and assigned to the same assignee as the present application.

As is well known in the art of field storage, certain stored products, particularly products of a highly volatile nature, present a problem of conservation in that the tank is vented to the atmosphere and product is lost because of climatic action on the storage vessel which induces product vaporization. The pressure change within the vessel as a result of such action is responsible for both venting of vaporized product and intake of air. Practical considerations of initial cost and the like have required that rather than build the tank to withstand expected induced pressure differnetials, it is more feasible to provide each tank with the pressure relief vent. Pressure variation within the tank below atmospheric on occasions occurs with the result that the vent must also be operative to allow air from the atmosphere to enter the tank and provide for pressure equalization. Much effort has been expended to conserve products thus lost through vaporization and air vapor mixing. One practice that has found acceptance in the art is to manifold a plurality of cone or fixed volume tanks with a tank or tanks having variable volume characteristics such as the lifter roof type storage tank, whereby vapor generated in the fixed volume tank or tanks may be carried to and stored in the variable volume tank upon certain determined pressure differentials occurring. Alternately, a change in conditions on occasion could result in a return vapor flow from the variable volume tank or tanks to the fixed volume tank or tanks. In effect, the entire system is permitted to "breathe" and accommodate a variation in vapor volume. The advantages of this arrangement has long been appreciated by those skilled in the art, and it is a main purpose of this invention to provide substantial improvements relative thereto. For example, it is a general purpose of the disclosed invention to so minimize pressure variation within the arrangement that the need for relatively expensive excessive reinforcing of the fixed volume tanks is reduced to a minimum. This feature of the invention also accommodates a reduction in manifold size with additional reduction in expense. The advantages mentioned are of definite importance in the construction of new tanks and of greater importance when installed on existing tankage because to install the system here considered on existing tankage require an even greater expense in addition to the inconvenience and financial loss resulting from the removal of existing tankage from service while modifications are made.

With the above in mind, it is a general object of the invention to provide a novel system of the type described having improved features over those heretofore found in the art.

It is a specific object of the invention to provide an arrangement of the type described which eliminates the need for expensive reinforcing of tanks in a multiple tank manifold system and the like while maintaining and improving the advantages thereof.

It is a further object of this invention to provide a novel valve structure for use in manifold systems including a system of the type described.

These and other objects of the invention will become apparent in the course of the following description and from an examination of the associated drawings, wherein:

Figure 1:
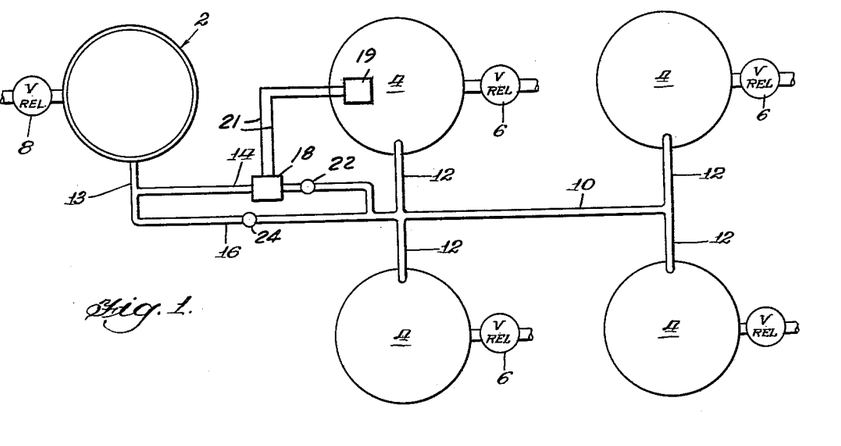
FIGURE 1 is a schematic view of a tank system.
Figure 2:
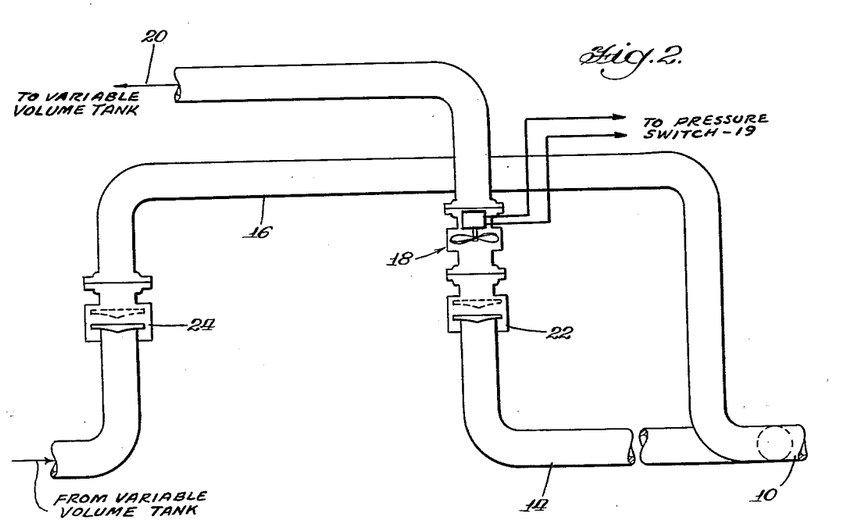
FIGURE 2 is a fragmentary detail view of portions of the manifold and valving arrangement employed in the system illustrated in FIGURE 1.

Describing first a type of arrangement wherein the invention can be advantageously utilized and directing attention to the FIGURES 1 and 2, it will be seen that this type of arrangement employs a variable volume lifter roof type field storage tank indicated generally at 2. A plurality of fixed volume or cone roof type field storage tanks 4 may be physically located in adjacent relationship to the variable volume tank 2. Each tank 4 may be provided with a relief valve 6 which is operative to establish venting communication between the vapor portion (not shown) of each cone roof tank and the atmosphere upon determined pressure differentials, both above and below atmospheric, existing between the atmosphere and the internal parts of the tanks. Another relief valve 8 may be associated with the variable volume tank 2 and also provides communication or venting between the atmosphere and the vapor portion of said tank (not shown) upon the existence of determined pressure differentials, both above and below atmospheric. It will be understood that the terms "vapor portion" or "vapor space" means a portion of the tank not normally occupied by stored liquid product and which may be occupied by gases other than vapor, and the term "pressure level" comprehends pressures both above and below atmospheric.

A manifold line 10 may be provided to establish communication, as at 12, with the vapor space (not shown) in each of the cone roof tanks 4. The other end of the manifold line 10 communicates as at 13 with the vapor space (not shown) of the variable volume tank 2. The manifold line 10 intermediate the variable volume tank 2 and fixed volume tanks 4 is separated into two branches 14 and 16.

Considering FIGURE 2, in light of FIGURE 1, it will be noted that the branch line 14 has disposed therein a blower 18 arranged to move any fluid therein in the direction of the arrow 20 or toward the vapor portion of the variable volume tank 2. A valve 22 is also provided in the line 14 in any series relation with the blower 18, however, the valve 22 is located on the vacuum side of the blower 18.

The line 16 has disposed therein a second valve 24 which normally accommodates flow of fluid therein only in the direction of the arrow 26 or toward the vapor portions of the fixed volume tanks. Valve 24, of course, may be weighted or otherwise designed so that a determined pressure differential must exist between the variable volume and fixed volume tanks before it will permit flow therethrough.

The blower 18 is preferably arranged to be energized in response to a determined pressure level existing in the vapor space of the fixed volume tanks 4. This level is somewhat below the operating level of the vent valves 6. This may be accomplished by any conventional means such as, for example, the blower 18 may be operated by pressure switch 19 located in one of the cone roof tanks 4 which is connected to the motor circuit (not shown) of blower 18 by lines 21. Pressure switch 19 is closed in response to the raising of the pressure in the vapor space of the fixed volume tanks to the determined level and blower 18 is operated in response thereto.

In the operation of the arrangement illustrated in FIGURES 1 and 2, it will first be assumed that conditions have induced pressure build up due to product vaporization in the vapor space of the fixed volume tanks. When this pressure has raised to a point somewhat below the venting pressure of the relief valve 6 the blower 18 is actuated, and, upon production of a determined vacuum on the vacuum side thereof, will cause the valve 22 to open which in turn accommodates vapor flow under the action of the blower 18 from the vapor space of the fixed volume tanks 4 to the vapor space of the variable volume tank 2. The valve 22, of course, admits of vapor flow only in the direction indicated. Continued action or flow in the manner described will result in the operation of the expansion roof tank 2 in the conventional manner, increasing the vapor volume capacity thereof and accommodating the storage therein of the vapor produced in the fixed volume tanks 4. In the event that the lifter roof or variable volume tank is raised to capacity a switch connection (not shown) may be provided which is engaged and operated by the lifter roof and interlocked with the blower 18 to de-energize same and prevent needless operation thereof. In this circumstance, the entire vapor capacity of the system has been utilized and continued vapor pressure build up will result in venting to the atmosphere through valves 6 and 8.

Upon a reduction in the pressure in the vapor space of the fixed volume tanks 4 to a predetermined level above the minimum or vacuum setting of the associated valves 6, the valve 24 may open to accommodate flow from the variable volume tank 2 to the fixed volume tanks 4 through the line 16. Thus it will be seen that the fixed volume tanks 4 are prevented in this circumstance from drawing a vacuum which would accommodate the entrance of atmospheric air and thus effecting vaporization at a subsequent time.

Figure 3:
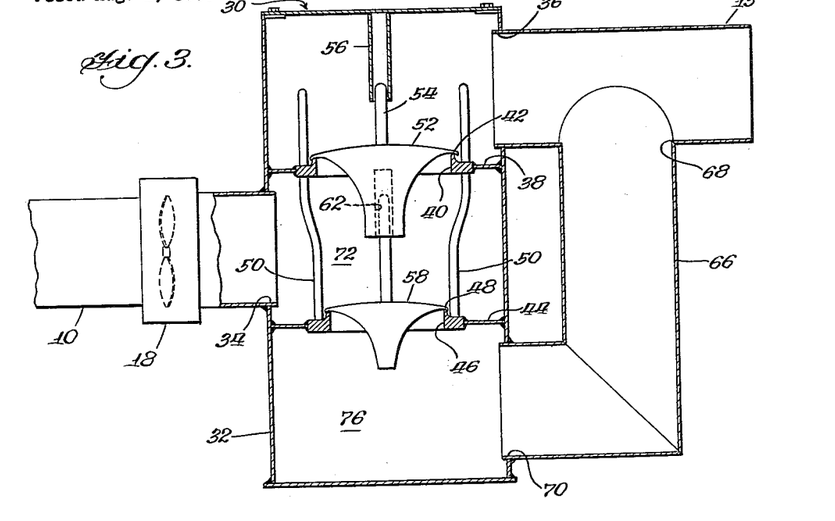
FIGURE 3 illustrates a cross sectional view of a valve arrangement which may be advantageously utilized in systems employing the invention.

What has been described in FIGURES 1 and 2 is a double manifold line type of arrangement wherein a valve is inserted in each of two manifold lines. FIGURES 3 through 9 illustrate valve arrangements which are inserted directly into a single manifold line and which combine to provide the inventive overall system. It is believed that with this background the inventive system will be more readily understood and the features embodied therein will become more apparent. Attention is now directed to FIGURE 3 which illustrates a valve arrangement which may be utilized in systems embodying the invention.

It will be noted, however, that a single valve structure 30 is provided and comprises a tank 32 having a line 10 communicating as at 34 with one side thereof, it being understood that the line 10 establishes communication with the vapor portions of the cone roof tanks 4 as previously described in FIGURES 1 and 2. A line 13 communicates as at 36 with another side of tank 32, said line 13 communicating with the vapor portion of the variable volume tank 2 as previously described in FIGURES 1 and 2. The internal structure of the valve arrangement 30 is seen to comprise an annular shelf 38 having a central annular opening 40 provided with a valve seat 42. Spaced a suitable distance therebelow is another annular shelf 44 also provided with a central opening 46 having a valve seat 48 thereon. Vertical members, 50, 50 interconnect the members 38 and 44 to aid in the support thereof and further to aid in the pallet guiding action hereinafter described. A first pallet 52 may be arranged to sealingly engage the lip 42 and is provided with an upwardly extending bar 54 which in turn is telescopically received in a guide pipe 56. A lower pallet 58 sealingly engages the lips 48 and is provided with an upwardly extending bar 60 which is guidably received in an aperture 62 centrally formed in and downwardly directed from the pallet 52.

It will be noted that the pipe 10 communicates with the valve arrangement 30 in an area intermediate the pallets 52 and 58 and it further will be noted that the pipe 13 communicates with the valve arrangement 30 in an area above the pallet 52. A by-pass line 66 has one end communicating with the line 13 outwardly of the valve arrangement 30 as at 68 and its other end communicating with the valve arrangement 30 as at 70 in an area below the shelf 44.

The operation of this embodiment is as follows, and upon the existence of a determined pressure level in the cone roof tanks illustrated as 4 in FIGURE 1 the blower 18 is energized and directs vapor therefrom conveying same to the chamber 72 of the valve arrangement 30. This action increases the pressure in said chamber 72 urging the pallet 52 upwardly and acting to maintain the pallet 58 in sealed engagement with the seat 48. Opening of pallet 52 accommodates vapor transfer through the line 13 to the variable volume tank illustrated as 2 in FIGURE 1.

As vapor pressure in the cone roof tanks is relieved, the blower de-energizes and the back effect of the pressure in the variable volume tank closes the pallet 52 again to sealingly engage its seat 42. It will be noted that in this circumstance the back pressure effect of the variable volume tank is also admitted to a chamber 76 below the pallet 58, but that the pallet 58 is so designed that its own weight, when in combination with the lower pressure effect transmitted from the cone roof tanks, will not open to permit the return distribution of the variable volume pressure.

Upon further reduction of pressure in the cone roof tanks to a predetermined point and the existence of a new and predetermined pressure differential between the variable volume tank and the cone roof tanks, the pallet 58 will be urged to open and admit certain flow therethrough from the expansion tank to the cone roof tanks. Again, upon building up of a determined pressure in the cone roof tanks the pallet 58 will close and halt this flow.

Figure 4:
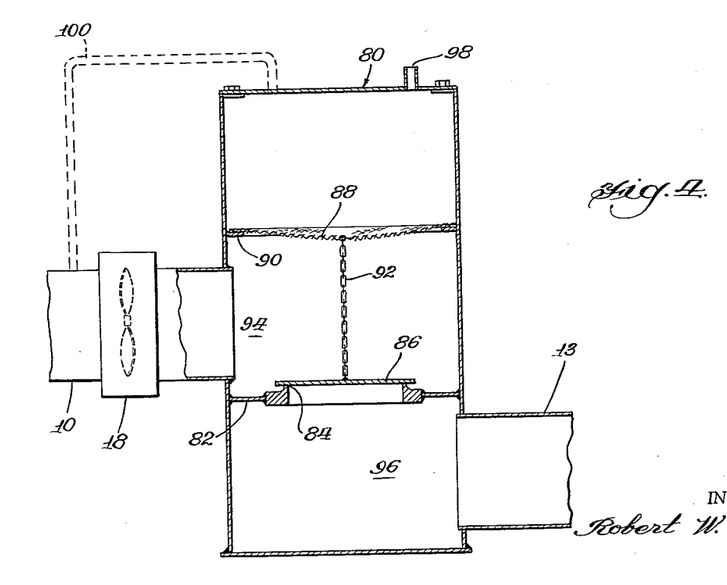
FIGURE 4 illustrates a cross sectional view of another valve arrangement which may be utilized in systems employing the invention.

Directing attention to FIGURE 4 which schematically illustrates another valve arrangement of the inventive system, it will be seen that the line 10 communicates with a valve arrangement 80 and the line 13 also communicates therewith. Internally of the valve arrangement 80 an annular member 82 is provided having a sealing edge or seat 84 which may operatively engage the pallet 86 and provide a seal therebetween. A fabric diaphragm member 88 is annularly connected to a member 90 to span substantially a major portion of the cross section of the valve arrangement 80. Preferably, a flexible chain or link 92 interconnects a central portion of the fabric member 88 and pallet 86. It will be noted that the line 10 communicates with a chamber 94 located intermediate the members 82 and 90 while the line 13 communicates with a chamber 96 below the member 82. An appropriate vent 98 may be provided in the valve arrangement 80.

In normal operation of this embodiment the blower 18 is again actuated by the existence of a determined pressure level in the cone roof tanks whereupon vapor flow is induced into the chamber 94. The cross sectional area of the fabric diaphragm member 88 as compared to the area of the pallet 86 is such that the increased pressure in the chamber 94 will cause the fabric diaphragm member 88 to rise and the interconnected pallet 86 will be lifted from its seat 84. Thus vapor flow is accommodated via line 10, valve arrangement 80 and line 13 to the variable volume tank 2. Upon a determined reduction of vapor pressure in the cone roof tanks 4 the blower 18 is de-energized and the pallet 86 again engages the seat 84 to prohibit any return flow. Again it will be noted that pallet 86 is such that its own weight, when combined with a slight pressure from the cone roof tanks, will not open to admit flow from the expansion roof tank to the cone roof tanks. Upon reduction of pressure in the cone roof tanks to a determined level the back pressure effect from the variable volume tank will open the pallet 86 and permit return flow from the variable volume tank to the cone roof tanks until a determined pressure level is again built up in the cone roof tanks whereupon the pallet 86 will close.

If desired the vent 98 may be eliminated and a line indicated in phantom at 100 may connect at a point above the fabric diaphragm member 88 to the vacuum side of line 10. In this instance, upon actuation of the blower 18 the effect of velocity flow through the line 10 will be such to induce a slight pressure reduction in the valve 80 above the fabric diaphragm member 88 and thus aid in raising motion during flow from the cone roof tanks to the expansion roof tank.

Figures 5, 6:
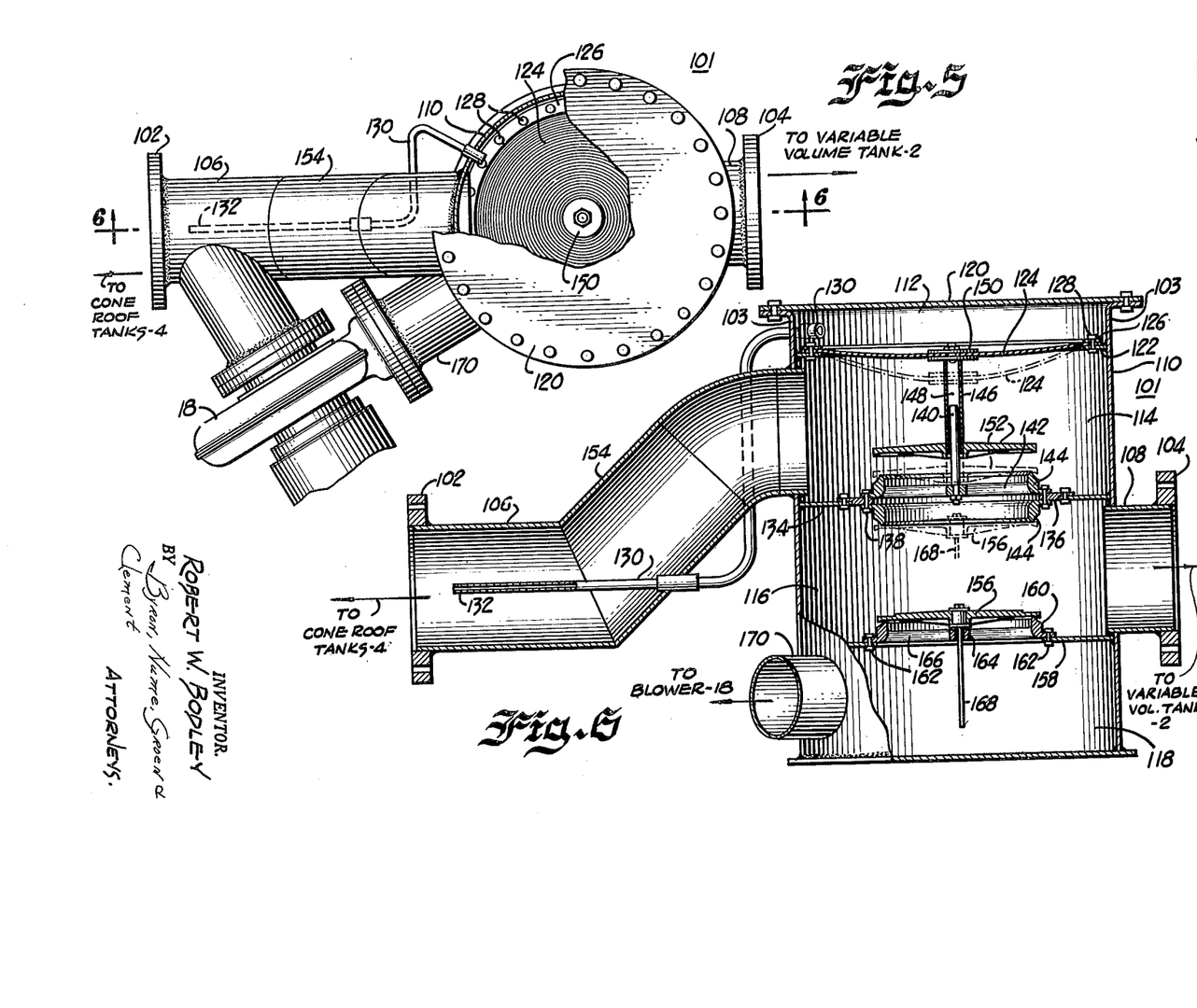
FIGURE 5 illustrates a partially cut-away plan view of an additional arrangement which may be utilized in systems employing the invention.
FIGURE 6 illustrates a partial cross sectional view of the valve arrangement illustrated in FIGURE 5 taken along the line 6—6.

Another valve arrangement is illustrated in FIGURES 5 and 6 and is generally designated 101. The valve arrangement 101 directs flow from the cone roof tanks 4 through the valve arrangement 101 to the variable volume tank 2 upon the existence of a determined pressure level in the cone roof tanks 4. Further flow is directed from the variable volume tank 2 through the valve arrangement 101 to the cone roof tanks 4 upon the existence of a predetermined pressure differential between the variable volume tank 2 and the cone roof tanks 4. Chatter, or the quick opening and closing of the valve 101, is substantially eliminated by the provision of an eductor mechanism and a movable diaphragm member. However, the diaphragm member is operably associated with vapor flow from the variable volume tank 2 to the cone roof tanks 4.

It will be noted that the valve structure 101 is adapted to be connected with line 10 (not shown in FIG. 5) at flange 102 by suitable fastening means to establish communication with the vapor portions of the cone roof tanks 4 previously described. Positioned at the opposite side of valve unit 101 is flange 104 which is adapted to be connected to line 13 (not shown in FIGURE 5) to establish communication with the vapor portion of the variable volume tank previously described. It will be further noted that line portions 106 and 108 of the valve unit 101 are positioned on substantially the same center line. Therefore, the valve unit 101 may be readily installed into a straight manifold line of an existing storage tank system without the need of added linkages.

As shown in FIGURE 6, the valve structure 101 comprises an enclosed substantially cylindrical vapor sealed tank 110 comprising four separate vapor impervious chambers 112, 114, 116 and 118, respectively.

Chamber 112 is provided to substantially eliminate the chatter of pallet 152, described below. An eductor 130 is associated with chamber 112 and reduces its pressure, for a purpose described below, when vapor flows from the variable volume tank 2 to the cone roof tanks 4. Chamber 112 comprises: roof portion 120 and the wall portions 103 of the vapor sealed tank 110; annular shelf 122; and a diaphragm member 124 composed of a material such as rubber or neoprene adapted to be vapor impervious. Diaphragm member 124 is attached to the annular shelf 122 by means of an annular bracket 126 and a plurality of bolts 128 securing the circumferential edges of the diaphragm member 124 to the shelf 122. The diaphragm member 124 spans a substantial major portion of the cross section of the valve structure 101. The central portions of the diaphragm member 124 move up and down in the tank 110 as will be seen more clearly hereinafter. One end of an eductor line 130 is connected to the chamber 112 and the opposite end 132 is positioned in line 106 as illustrated in FIGURES 5 and 6. Chamber 112 is in communication with line 106 of the valve structure 101 and, therefore, the cone roof tanks 4.

Chamber 114 which is positioned immediately below chamber 112 is viewed in FIGURES 5 and 6 of the drawings. Chamber 114 is connected to the cone roof tanks 4 through line portions 154 and 106 of the valve structure 101 and communicates with the variable volume tank 2 through chamber 116 of the valve structure 101 and is adapted to direct vapor flow from the variable volume tank 2 to the cone roof tanks 4 upon the existence of a predetermined pressure differential between the variable volume tank 2 and the cone roof tanks 4. Chamber 114 is provided with an annular shelf 134 having attached thereto by a plurality of machine bolts 138, an annular double valve seat mechanism 136. The double valve seat mechanism 136 has positioned therein at the center portion thereof an annular spoke member 142. Spoke member 142 has positioned therein at the center or hub portion a guide shaft 140. The spoke member 142 may be attached to the double valve seat mechanism 136 by means of a plurality of machine bolts or any other suitable means. Provided at the upper and lower ends of the double valve seat mechanism 136 are annular valve seat rings 144 made of any suitable valve seat material.

Also positioned within chamber 114 is a movable pallet member 152 having shaft 146 attached thereto. Shaft 146 is provided with a longitudinal slot 148 enabling pallet 152 to be guided in its vertical movement by guide shaft 140 positioned on the double valve seat mechanism 136. Pallet 152 is attached to the central portion of the vapor impervious diaphragm 124 by suitable bracket means 150 positioned on the upper end of shaft 146. Pallet 152 is substantially disc shape and is adapted to sealingly engage the upper valve seat ring 144 of the double valve seat mechanism 146 in its normal position as illustrated in phantom in FIGURE 6. Chamber 114 is in communication with the cone roof tanks 4 through the manifold line 10 and the lines 106 and 154 of the valve unit 101. When pallet 152 is in a raised or open position, as illustrated in solid lines in FIGURE 6, chamber 114 is in further communication with the variable volume tank 2, through chamber 116, line 108 of valve unit 101, and manifold line 13.

Chamber 116 has vapor flow directed therethrough from the variable volume tank 2 to the cone roof tanks 4 through the double valve seat mechanism 136 when pallet 152 is in its raised or open position. Further vapor is directed through chamber 116 from the cone roof tanks 4 to the variable volume tank 2 responsive to the opening of a valve pallet 156 as will be seen hereinafter. Chamber 116 has provided therein an annular shelf 158 and a valve seat mechanism 160 which may be attached to the annular shelf 158 by machine bolts 162. Positioned concentrically within the valve seat mechanism 160 is a guide bearing 164 which may be attached to the valve seat mechanism 160 by an integral spoke member 166, or by any other suitable means. Adapted to sealingly engage the valve seat mechanism 160 is a movable pallet 156 which has attached thereto and extending therefrom a guide shaft 168. Guide shaft 168 is adapted to be slidably engageable with a guide bearing 164 positioned within the valve seat mechanism 160 and thereby guides pallet 156 in its vertical movement. Pallet 156 is adapted to sealingly engage valve seat mechanism 160 as illustrated in solid lines in FIGURE 6 and to sealingly engage the double valve seat mechanism 136 at the lower valve seat ring 144 as illustrated in phantom in FIGURE 6, as will be more clearly understood hereinafter.

Valve unit 101 directs flow from the variable volume tank 2 to the cone roof tanks 4 through chambers 116 and 114 in response to the existence of a predetermined pressure differential between the variable volume tank 2 and the cone roof tanks 4. Further valve unit 101 directs flow from the cone roof tanks 4 to the variable volume tank 2 through chambers 118 and 116 in response to the energization of blower 18. Blower 18 is energized responsive to the existence of a predetermined pressure level in the cone roof tanks 4.

Chamber 118 is in communication with blower 18 through line 170 as seen in FIGURE 6 and when the blower 18 is activated the pallet 156 is raised and communication is provided between the cone roof tanks 4 and the variable volume tank 2.

The operation of the valve unit 101 is as follows:

The existence of a predetermined pressure level in the cone roof tanks 4 activates a pressure switch (not shown) positioned within the cone roof tanks 4 which in turn activates the blower motor (not shown) of the blower 18. The blower 18 directs vapor from the cone roof tanks 4 through the line 106, the blower 18, line 170, into chamber 118. This increases the pressure in the chamber 118 urging pallet 156 in a vertical direction as seen in FIGURE 6. Pallet 156 is guided in its upward movement by the guide shaft 168. The capacity of the blower 18 is chosen such that the activation of blower 18 causes the pallet 156 to sealingly engage the lower valve seat ring 144 of the double valve seat mechanism 136 as seen in FIGURE 6 thus insuring that the pallet 152 will not also be raised when the blower 18 is activated. The rising of the pallet 156, as aforedescribed, accommodates vapor transfer from the cone roof tanks 4 to the variable volume tank 2.

When the vapor pressure in the cone roof tanks 4 has been reduced below the above described predetermined level as determined by the pressure switch positioned in the cone roof tanks 4, the blower 18 de-energized and the pallet 156 returns to its normal or closed position as illustrated in solid lines in FIGURE 6, and sealingly engages the valve seat mechanism 160. The pallet 156 is designed so that its own weight will prevent it from opening when the blower 18 is de-energized.

When a predetermined pressure differential exists between the cone roof tanks 4 and the variable volume tank 2 i.e., the pressure in the cone roof tanks 4 is below the pressure in the variable volume tank 2, pallet 152 is urged upwardly from sealing engagement with the double valve seat mechanism 136 and is guided in its upward movement by the guide shaft 140 of the double valve seat mechanism 136. When the pallet 152 is in its open position as illustrated in solid lines in FIGURE 6 vapor flows from the variable volume tank 2 to the cone roof tanks 4. In response to this flow the diaphragm member 124 is urged into vertical movement as a result of the increased pressure in chamber 114 and will thus aid in the upward movement of the pallet 152 inasmuch as the diaphragm member 124 is connected to the pallet 152 by bracket 150 as illustrated in FIGURE 6.

The cross sectional area of the diaphragm member 124 is such that the increased pressure in the chamber 114 will cause the diaphragm to rise. The diaphragm member 124 initially resists the upward movement of the pallet 152 inasmuch as diaphragm member 124 must also be initially lifted when pallet 152 is first unseated from the double valve seat mechanism 136. Diaphragm member 124 also resists the reseating of the pallet 152 on the double valve seat mechanism 136 as will be seen hereinafter.

As pallet 152 is raised in a vertical direction, as seen in FIGURE 6, vapor from the variable volume tank 2 flows through the line 13 through the line 108 of the valve unit 101, through chamber 116 into chamber 114, through the line 154 and 106 of the valve unit 101, through the manifold line 10 to the cone roof tanks 4. After the pressure differential between the variable volume tank 2 and the cone roof tanks 4 has dropped below the above described predetermined pressure differential required to unseat the pallet 152 from the double valve seat mechanism 136, the pallet 152 will tend to return to its normal sealingly engageable position on the double valve seat mechanism 136.

However, the pressure in the chamber 112 is below the pressure in chamber 114 because of the positioning of one end 132 of the eductor 130 in the line 106 of the valve structure 101. The flow of vapor from the variable volume tank 2 to the cone roof tanks 4 through line 106 and consequently past the end 132 of the eductor 130 reduces the pressure in chamber 112 by what may be termed a drawing out effect. A partial vacuum or reduced pressure is formed at the end 132 of the eductor 130 during flow from the variable volume tank 2 to the cone roof tanks 4 and consequently vapor is drawn from chamber 112 thereby reducing the pressure within chamber 112 and thereby creating a pressure differential between chambers 112 and 114. This last mentioned pressure differential tends to hold diaphragm member 124 in a raised position to thereby restrict pallet 156 from immediate movement towards the double seat mechanism 136 and chatter of pallet 156 is substantially eliminated thereby.

Figures 7, 9:
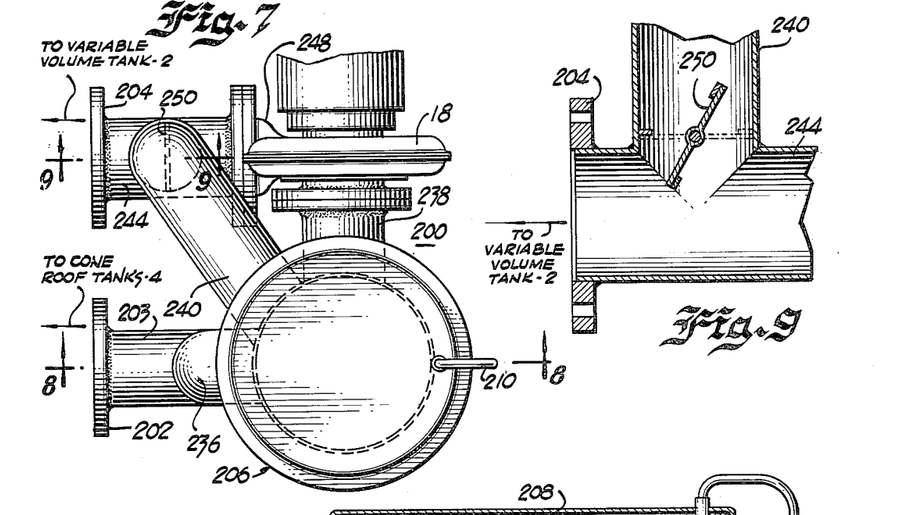
FIGURE 7 illustrates a plan view of an additional valve structure which may be utilized in systems employing the invention.
FIGURE 9 illustrates a cross sectional view of the valve structure illustrated in FIGURE 7 taken along the line 9—9.
Figure 8:
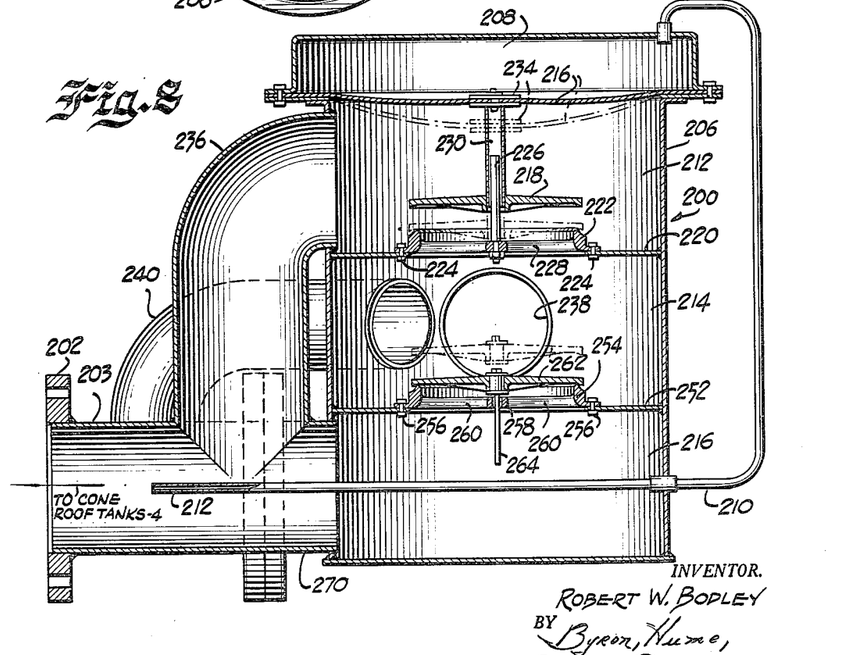
FIGURE 8 illustrates a cross sectional view of the valve structure illustrated in FIGURE 7 taken along the line 8—8.

Attention is now directed to another valve arrangement 200 as illustrated in FIGURES 7, 8 and 9. Valve arrangement 200 directs flow from the variable volume tank 2 to the cone roof tanks 4 when a predetermined pressure differential exists between the variable volume tank 2 and the cone roof tanks 4. As in FIGURES 5 and 6 a diaphragm member is associated with this flow to prevent valve chattering. Also the valve arrangement 200 directs flow from the cone roof tanks 4 to the variable volume tank 2 when a predetermined pressure level exists in the cone roof tanks 4. However, a blower 18 is positioned in the variable volume tank 2 side of the valve arrangement 2 and draws the valve arrangement open rather than pushes the valve arrangement open as in FIGURES 5 and 6. More specifically the cone roof tanks 4 are connected to valve arrangement 200 at the flange portion 202 of the valve arrangement 200. The variable volume tank 2 is connected to the valve arrangement 200 at the flange portion 204. The valve arrangement 200 comprises a substantially cylindrical vapor sealed tank 206 having formed therein vapor impervious chambers 208, 212, 214 and 216.

Chamber 208 has a similar function as chamber 112 illustrated in FIGURES 5 and 6 and generally inhibits chattering of a pallet associated therewith as will be seen hereinafter.

Chamber 208 is completely sealed except for the connection to eductor 210 at one end thereof. The opposite end 212 of the eductor 210 is positioned in line 203 of the valve structure 200 and is in communication with the cone roof tanks 4. Attached to an annular shelf forming a portion of the bottom of chamber 208 as illustrated in FIGURE 8 is a diaphragm member 216 which may be composed of a material such as rubber or neoprene, or the like, which is vapor impervious.

Chamber 212 directs flow from the variable volume tank 2 to the cone roof tanks 4 when a predetermined pressure differential exists between the variable volume tank 2 and the cone roof tanks 4 through lines 236 and 203 and chamber 214, as will be seen hereinafter.

Chamber 212 has formed therein an annular shelf 220 which has positioned thereon, a valve seat mechanism 222, which may be attached to shelf 220 by any suitable means such as bolts 224. Positioned in and concentric with the valve seat mechanism 222 is the pallet guide shaft 226, which may be attached to valve seat mechanism 222 by means of spoke member 228. A pallet 218 is positioned within chamber 212 and has an extended hollow portion 230 formed thereon adapted to receive the guide shaft 226 of the valve seat mechanism 222. Pallet 218 by means of bracket 234 is secured at the upper end of the extended hollow portion 230 to the center portion of diaphragm member 216 as illustrated in FIGURE 8. Pallet 218 is adapted to be sealingly engageable with the valve seat mechanism 222 when pallet 218 is seated thereon as illustrated in phantom in FIGURE 8. Chamber 212 is connected to the cone roof tanks 4 through the manifold line 10, flange 202 and line 203 and 236 of the manifold valve unit 200.

Blower 18 is energized responsive to the existence of a predetermined pressure level in the cone roof tanks 4 but in this valve arrangement does not push the valve arrangement open but pulls the valve arrangement open as will be more clearly seen hereinafter.

Blower 18 is connected to chamber 214 through line 238 of the valve unit 200. Chamber 214 directs flow from the variable volume tank 2 to the cone roof tanks 4 and vice versa as will also be seen hereinafter. Also connected to chamber 214, is a by-pass line 240 which is connected to the variable volume tank 2 through the line 244 of the valve unit 200. Blower 18 is also connected to the line 244 by line 248 as illustrated in FIGURE 7. Chamber 214 has formed therein an annular shelf 252 to which is attached a valve seat mechanism 254 secured by suitable means such as machine bolts 256. Positioned in and concentric with the valve seat mechanism 254 is a guide bearing 258, which may be positioned by a spoke element 260. Positioned within the chamber 214 is a pallet 262 which has formed thereon a guide shaft 264 adapted to fit in and slidably engage guide-bearing 258. Pallet 262 is adapted to sealingly engage the valve seat mechanism 254 in the position illustrated in solid lines in FIGURE 8.

Chamber 216 which is positioned below chamber 214 as illustrated in FIGURE 8 is connected to the cone roof tanks 4 through the lines 203 and 270 of the valve unit 200 and vapor is directed through chamber 216 to chamber 214 in response to the energization of blower 18.

The operation of the embodiment of the invention illustrated in FIGURES 7, 8 and 9 is as follows:

The existence of a predetermined pressure level in the cone roof tanks 4 activates a pressure switch (not shown) which is set to be activated by the existence of a predetermined pressure level in the cone roof tanks 4 which in turn activates the blower motor (not shown) of the blower 18. The blower 18 directs vapors from the chamber 214 through line 238, the blower 18 itself, and lines 248 and 244 to the variable roof tank 2.

The activation of blower 18 decreases the pressure in the chamber 214 and increases the pressure differential between chambers 216 and 214. Pallet 262 opens as illustrated in solid lines in FIGURE 8 in response to the pressure differential between chambers 216 and 214 caused by the activation of blower 18 and moves in a vertical plane thereby allowing vapors to pass from the cone roof tanks 4 through the lines 203 and 270, chamber 216, chamber 214, blower 18 and line 248 into line 244 and further into the variable volume tank 2. Vapor flow does not occur through the by-pass line 240 inasmuch as butterfly valve mechanism 250 is closed at this time as will be seen hereinafter.

The vapor flow from the cone roof tanks 4 into the variable volume tank will continue over the aforedescribed path until the pressure in the cone roof tanks is reduced below the predetermined level as determined by a pressure switch (not shown) positioned in the cone roof tanks 4. The resulting decrease in the vapor pressure in the cone roof tanks 4 below the predetermined level and will cause the blower 18 to deenergize and the back pressure from the variable volume tank 2 will cause the pallet 262 to return to its sealing position on the valve seat mechanism 254.

A butterfly valve mechanism 250 is provided in by-pass line 240 as best illustrated in FIGURE 9. The butterfly valve mechanism is provided to prevent circulation through the by-pass line 240 when the blower 18 is activated. The butterfly valve mechanism 250 may be weighted or mounted off center of its own axis so that it will be in its open position when the blower 18 is inactivated. The open position is that position wherein the butterfly valve mechanism 250 presents the least impedance to the flow of vapors in the by-pass line 240. When the blower 18 is activated vapor will flow to the variable volume tank 2 through lines 248 and 244 and will completely close the valve mechanism 250 thereby decreasing the flow of vapor through the by-pass line 240. The valve mechanism 250 is illustrated in FIGURE 9 as being partially open for ease of understanding but the valve mechanism 250 is completely closed when blower 18 is activated.

When a predetermined pressure differential exists between the variable volume tank 2 and the cone roof tanks 4, i.e., when the pressure in the cone roof tanks 4 is below the pressure in the variable volume tank 2, the pallet 218 moves in a vertical direction as illustrated in FIGURE 8. The pallet 218 is guided in its vertical movement by the guide shaft 226 positioned on the valve seat mechanism 222 as illustrated in FIGURE 8. Vapor will then flow from the variable volume tank 2 through the line 244, the by-pass line 240 into the chamber 214 through the valve seat mechanism 222 into chamber 212 and from chamber 212 through lines 236 and 203 into the cone roof tanks 4.

The flow of vapor from the chamber 214 into the chamber 212 causes the diaphragm member 216 to exert an upward pull on the pallet 218. The effect of velocity flow during the transfer of vapor from chamber 212, through the line 236 and the line 203 to the cone roof tanks 4 acting through the eductor 210 will be such as to provide a pressure reduction in chamber 208 by means of the eductor 210 one end 212 of which is positioned in the line 203 as was described with respect to eductor 130 in FIGURES 5 and 6. The pressure reduction in the chamber 208 creates a pressure differential between the chamber 212 and the chamber 208 causing the diaphragm member 216 to exert a greater force on the pallet 218, tending to keep the pallet 218 open and thereby substantially eliminating chatter of the pallet 218 in operation.

As soon as a predetermined pressure builds up in the cone roof tanks 4 or, in other words, as soon as the pressure differential between the cone roof tanks 4 and the variable volume tank 2 decreases to a point below the predetermined pressure differential the weight of the pallet 218 itself will cause the pallet to return to its sealing position on the valve seat mechanism 222 as illustrated in phantom in FIGURE 8.

It will be thus appreciated that in the novel arrangements disclosed the pressures of the variable volume tank 2 no longer effectively impinges on the operation of the fixed volume tanks 4 associated therewith in the system. The immediate result of this circumstance is that reinforcing structure of the fixed volume tanks 4 heretofore required is eliminated with the consequent reduction of installation costs previously mentioned.

While the forms described herein are at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. In a storage tank system wherein vapor communication is desired between a fixed volume tank and a variable volume tank in response to the build-up of predetermined pressure differential between said fixed volume tank and said variable volume tank comprising: a valve structure having associated therewith an input line connected with said fixed volume tank and an output line connected to said variable volume tank, said valve structure adapted to control flow from said input line to said output line in opposite directions and comprising a first chamber, a second chamber and a third chamber, said first chamber and said third chamber being connected to said input line, a by-pass line connecting said chamber to said output line, a valve mechanism positioned within said by-pass line and operative to inhibit the flow of vapor through said by-pass line when said blower is activated, a blower line having positioned therein a blower means operative to induce flow from said second chamber to said output line upon energization of said blower means, said blower means being energized in response to the existence of a predetermined pressure level in said fixed volume tank, one end of said blower line being connected to said output line, a first movable pallet member positioned within said first chamber, a first pallet seat mechanism positioned within said first chamber, said first movable pallet member being normally engageable with said first pallet seat member to being normally engageable with said first pallet seat member to prevent vapor communication between said first chamber and said second chamber, a first movable diaphragm member connected to said first movable pallet member and positioned in said first chamber, said first movable pallet member movable from its normal position responsive to the existence of a predetermined pressure differential level between said second chamber and said first chamber to accommodate flow from said second chamber to said first chamber, said movable diaphragm member responsive to the flow of vapor in said first chamber to move with said first movable pallet, said first movable pallet member returning to its normal position after the pressure differential between said second chamber and said first chamber has been reduced to a point below said predetermined pressure differential level, a second movable pallet member positioned within said second chamber, a second pallet seat member positioned within said second chamber, said second movable pallet member in a normal position engageable with said second pallet seat member to prevent vapor communication between said third chamber and said second chamber, said second movable pallet member movable from its normal position in response to the activation of said blower means resulting in a decrease in pressure in said second chamber to accommodate flow from said third chamber to said second chamber.

2. In a storage tank system wherein vapor communication is desired between a fixed volume tank and a variable volume tank in response to the build-up of predetermined pressure differential between said fixed volume tank and said variable volume tank comprising; a valve structure having associated therewith an input line connected with said fixed volume tank and an output line connected to said variable volume tank, said valve structure adapted to control the flow from said input line to said output line in opposite directions and comprising, a first chamber, a second chamber, a third chamber, and a fourth chamber, said first chamber and said third chamber being connected to said input line, a by-pass line connecting said second chamber to said output line, a blower line having positioned therein a blower means operative to induce flow from said second chamber to said output line upon energization of said blower means, said blower means being energized in response to the existence of a predetermined pressure level in said fixed volume tank, one end of said blower line being connected to said output line, a first movable pallet member positioned within said first chamber, a first pallet seat mechanism positioned within said first chamber, said first movable pallet member being normally engageable with said first pallet seat member to prevent vapor communication between said first chamber and said second chamber, a first movable diaphragm member connected to said first movable pallet member and positioned in said first chamber, said first movable pallet member movable from its normal position responsive to the existence of a predetermined pressure differential level between said second chamber and said first chamber to accommodate flow from said second chamber to said first chamber, said movable diaphragm member responsive to the flow of vapor in said first chamber to move with said first movable pallet, said first movable pallet member returning to its normal position after the pressure differential between said second chamber and said first chamber has been reduced to a point below said predetermined pressure differential level, a second movable pallet member positioned within said second chamber, a second pallet seat member positioned within said second chamber, said second movable pallet member in a normal position engageable with said second pallet seat member to prevent vapor communication between said third chamber and said second chamber, said second movable pallet member movable from its normal position in response to the activation of said blower means resulting in a decrease in pressure in said second chamber to accommodate flow from said third chamber to said second chamber, and an eductor element interconnecting said fourth chamber and said input line for creating a pressure reduction in said fourth chamber when vapor is flowing from said output line to said input line to resist the movement of said first movable pallet back to its normal position when vapor is flowing from said output line to said input line, whereby chattering of said first movable pallet during flow from said output line to said input line is substantially eliminated.

3. In a storage tank system wherein vapor communication is desired between a fixed volume storage tank and a variable volume storage tank in response to the build-up of predetermined pressure differentials between said fixed volume storage tank and said variable volume storage tank, a first line connected to said fixed volume storage tank, a second line connected to said variable volume storage tank, valve structure adapted to control flow between said first line and said second line in opposite directions, a blower line connected to said first line, blower means positioned within said blower line and operative in response to the existence of a predetermined pressure level in said fixed volume storage tank to induce flow from said fixed volume storage tank to said variable volume storage tank through said valve structure, said valve structure having a first chamber, a second chamber connected to said first line, a third chamber connected to said second line, a fourth chamber connected to said first line via said blower line, a first movable pallet interconnecting said second chamber and said third chamber, said first movable pallet preventing vapor flow from said second chamber to said third chamber in its normal position and being operable to prevent flow from said second line to first line, a movable diaphragm member forming a part of said first chamber and a part of said second chamber, said movable diaphragm member connected to said movable pallet, a second movable pallet interconnecting said third and fourth chambers and operative in response to a pressure build-up resulting from energization of said blower means to cause said second movable pallet to move from its normal position to accommodate flow from said first line to said second line, and an eductor element interconnecting said first chamber and said first line and causing a reduction in pressure in said first chamber as vapor flows from said second line to said first line to aid said movable diaphragm member in its movement.

4. In a storage tank system wherein vapor communication is desired between a fixed volume storage tank and a variable volume storage tank in response to the build-up of predetermined pressure differentials between said fixed volume storage tank and said variable volume storage tank, a first line connected to said fixed volume storage tank, a second line connected to said variable volume storage tank, structure adapted to control flow between said first line and said second line in opposite directions, a blower line connected to said first line, blower means positioned within said blower line and operative in response to the existence of a predetermined pressure level in said fixed volume storage tank to induce flow from said fixed volume storage tank to said variable volume storage tank through said valve structure, said valve structure having a first chamber, a second chamber connected to said first line, a third chamber connected to said second line, a fourth chamber connected to said first line via said blower line, a double valve seat arrangement disposed via said second and third chambers, a first movable pallet interconnecting said second chamber and said third chamber, said first movable pallet interconnecting said second chamber and said third chamber, said first movable pallet preventing vapor flow from said second chamber to said third chamber in its normal position and being operable to prevent flow from said second line to first line, a movable diaphragm member forming a part of said first chamber and a part of said second chamber, said movable diaphragm member connected to said movable pallet, a second movable pallet interconnecting said third and fourth chambers and operative in response to a pressure build-up resulting from energization of said blower means to cause said second movable pallet to move from its normal position into engagement with said double valve seat arrangement to accommodate flow from said first line to said second line, and an eductor element interconnecting said first chamber and said first line and causing a reduction in pressure in said first chamber as vapor flows from said second line to said first line to aid said movable diaphragm member in its movement.

5. In a storage tank system wherein vapor communication is desired between a fixed volume storage tank and a variable volume storage tank in response to the build-up of predetermined pressure differentials between said fixed volume storage tank and said variable volume storage tank, a first line connected to said fixed volume storage tank, a second line connected to said variable volume storage tank, valve structure adapted to control flow between said first line and said second line in opposite directions, said valve structure including a plurality of chambers, a first valve member interconnecting a first pair of said chambers and operable to effect flow from said second line to said first line when the pressure in said variable volume tank exceeds the pressure in said fixed volume tank by a predetermined amount, a diaphragm member connected to said valve member and extending between one of said aforementioned chambers and a third chamber, and eductor means interconnecting said third chamber and said first line and responsive to the flow of vapor from said variable volume tank to fixed volume tank through said first line to reduce the pressure in said third chamber to aid the diaphragm member in its movement and to prevent the chattering of said valve member during said vapor flow.

6. In a storage tank system wherein vapor communication is desired between a fixed volume storage tank and a variable volume storage tank in response to the build-up of predetermined pressure differentials between said fixed volume storage tank and said variable volume storage tank, a first line connected to said fixed volume storage tank, a second line connected to said variable volume storage tank, valve structure adapted to control flow between said first line and said second line in opposite directions, blower means and associated blower passage connected to one of said lines and said valve structure, said valve structure including a first valve member operable to effect flow from said second line to said first line when the pressure in said variable volume tank exceeds the pressure in said fixed volume tank by a predetermined amount, a second valve member operable to effect flow from said first line to said second line when the pressure in said fixed volume tank reaches a predetermined value and a pressure responsive arrangement including a chamber provided with a diaphragm member connected to said first valve member and an eductor means extending between said chamber and said first line to decrease the pressure in said chamber when vapor flows through said first line to said fixed volume storage tank to thereby maintain said first valve member in its open position to prevent its chattering, said blower means being operable to open said second valve member to effect flow from said fixed volume tank to said variable volume tank, and means for preventing short-circuiting of said blower means during its operation.

7. A storage tank system comprising a fixed volume storage tank, a variable volume storage tank, means for providing vapor communication between said fixed volume storage tank and said variable volume storage tank, a valve structure provided in said vapor communication means for controlling flow between said tanks in opposite directions, and including a first line connected to said fixed volume storage tank, a second line connected to said variable volume storage tank, blower means in communication with said valve structure and operative in response to the existence of a predetermined pressure level in said fixed volume tank to induce uni-directional flow within said valve structure, a first movable pallet positioned in said valve structure adapted to control flow in said valve structure between said first line and said second line and operable in response to the energization of said blower flow means, a second movable pallet positioned in said valve structure adapted to control flow in said valve structure between said second line and said first line and operable in response to a predetermined pressure differential existing between said variable volume storage tank and said fixed volume storage tank, and a pressure responsive arrangement including a chamber provided with a diaphragm member connected to said second movable pallet and eductor means having a first end in communication with said chamber and a second end disposed in said first line to decrease the pressure in said chamber when vapor flows through said first line to said fixed volume storage tank and cause said diaphragm member to maintain said second pallet in an open position without chatter to effect flow from said variable volume storage tank to said fixed volume storage tank as long as a pressure differential exists between the tanks.

8. A storage tank system comprising a fixed volume storage tank, a variable volume storage tank, means for providing vapor communication between said fixed volume storage tank and said variable volume storage tank, a valve structure provided in said vapor communication means for controlling flow between said tanks in opposite directions, and including a first line connected to said fixed volume storage tank, a second line connected to said variable volume storage tank, a first movable pallet positioned in said valve structure adapted to control flow in said valve structure between said first line and said second line, a second movable pallet positioned in said valve structure adapted to control flow in said valve structure between said second line and said first line and operable in response to a predetermined pressure differential existing between said variable volume storage tank and said fixed volume storage tank, and a pressure responsive arrangement including a chamber provided with a diaphragm member connected to said second movable pallet and eductor means having a first end in communication with said chamber and a second end disposed in said first line to decrease the pressure in said chamber when vapor flows through said first line to said fixed volume storage tank and cause said diaphragm member to maintain said second pallet in an open position without chatter to effect flow from said variable volume storage tank to said fixed volume storage tank as long as a pressure differential exists between the tanks.

References Cited in the file of this patent

UNITED STATES PATENTS

| | | |
|---|---|---|
| 1,689,352 | Maxon | Oct. 30, 1928 |
| 1,701,870 | Conrader | Feb. 12, 1929 |
| 1,800,043 | Atwill | Apr. 7, 1931 |
| 1,901,576 | Atwill | Mar. 14, 1933 |
| 2,885,109 | Gilmore | May 5, 1959 |